United States Patent
Yao (10) Patent No.: US 7,534,990 B2
(45) Date of Patent: May 19, 2009

(54) COMPACT OPTICAL DELAY DEVICES

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 87 days.

(21) Appl. No.: 11/849,972

(22) Filed: Sep. 4, 2007

(65) Prior Publication Data

US 2008/0054160 A1     Mar. 6, 2008

Related U.S. Application Data

(60) Provisional application No. 60/842,453, filed on Sep. 5, 2006.

(51) Int. Cl.
*G02F 1/01*     (2006.01)
*G01J 1/04*     (2006.01)

(52) U.S. Cl. .............. 250/225; 250/205; 250/227.12; 359/246; 359/251; 372/32

(58) Field of Classification Search ............ 250/205, 250/227.11, 227.12, 227.17, 227.28, 225; 359/245–247, 251; 372/12, 32; 398/161
See application file for complete search history.

(56) References Cited

U.S. PATENT DOCUMENTS

| | | | |
|---|---|---|---|
| 5,723,856 A | 3/1998 | Yao et al. | |
| 5,777,778 A | 7/1998 | Yao | |
| 5,929,430 A | 7/1999 | Yao et al. | |
| 6,417,948 B1 * | 7/2002 | Chowdhury et al. | 398/158 |
| 6,567,436 B1 | 5/2003 | Yao et al. | |
| 7,187,870 B2 * | 3/2007 | Ilchenko et al. | 398/161 |
| 7,324,256 B1 * | 1/2008 | Sayyah | 359/245 |

* cited by examiner

*Primary Examiner*—Kevin Pyo
(74) *Attorney, Agent, or Firm*—Fish & Richardson P.C.

(57) ABSTRACT

Optical devices and techniques for using optical polarization of light to transmit through an optical path four times to quadruple a total delay in the light through the optical path.

25 Claims, 5 Drawing Sheets

FIG. 6B ures, optical devices and techniques for using optical polarization of light to transmit through an optical path four times to quadruple a total delay in the light through the optical path. In one implementation, an optical device can include an optical polarization beam splitter (PBS), a first optical path coupled to the PBS, a polarization reflector coupled to the first optical path, a second optical path coupled to the PBS and a reflector coupled to the second optical path. The PBS includes a first port, a second port and a third port. The light at a first optical polarization transmits through the PBS between the first port and the second port, and light at a second optical polarization orthogonal to the first optical polarization that enters at either of the second port and the third port is reflected to the other of the second port and the third port. The first optical path includes a first end optically coupled to the second port of the PBS to receive light from the second port and to direct light to the second port. The polarization reflector is coupled to a second end of the first optical path to reflect light received from the first optical path back to the first optical path with a reflected optical polarization that is orthogonal to a polarization of the light that initially enters the first optical path upon exiting the second port of the PBS. The second optical path includes a first end optically coupled to the third port of the PBS to receive light from the second port and to direct light to the third port. The reflector is coupled to a second end of the

COMPACT OPTICAL DELAY DEVICES

PRIORITY CLAIM

This application claims the benefit of U.S. Provisional Application No. 60/842,453 entitled "Compact Optical Delay Devices" and filed on Sep. 5, 2006, which is incorporated by reference as part of the specification of this application.

BACKGROUND

Variable optical delay devices can be used in various optical devices and systems where the length of an optical path or the phase of an optical signal needs adjustment to achieve certain operating conditions. For example, the length of at least one of the two optical paths of a Michelson optical interferometer can be adjusted by using a variable optical delay device. A fiber-based time-domain optical coherent tomography (OCT) device is an imaging device based on the Michelson optical interferometer design and can use a fiber stretcher in a reference optical path to stretch a fiber loop as the variable optical delay device to change a phase difference between the reference beam in the reference optical path and a probe beam in a separate probe optical path coupled to a sample under measurement. As another example, a fiber laser may include a fiber stretcher as a variable optical delay device inside the laser resonator to adjust the cavity length of the laser resonator. As yet another example, an opto-electronic oscillator (OEO) that includes an electrically controllable optical modulator and at least one active opto-electronic feedback loop with an optical part and an electrical part interconnected by a photodetector can include a variable optical delay device in the optical part of the active opto-electronic feedback loop to achieve a desired phase matching condition and to tune the oscillation frequency. Examples of OEO designs can be found in, e.g., U.S. Pat. Nos. 5,723,856, 5,777,778, 5,929,430 and 6,567,436.

SUMMARY

The specification of this application describes, among others, optical devices and techniques for using optical polarization of light to transmit through an optical path four times to quadruple a total delay in the light through the optical path. In one implementation, an optical device can include an optical polarization beam splitter (PBS), a first optical path coupled to the PBS, a polarization reflector coupled to the first optical path, a second optical path coupled to the PBS and a reflector coupled to the second optical path. The PBS includes a first port, a second port and a third port. The light at a first optical polarization transmits through the PBS between the first port and the second port, and light at a second optical polarization orthogonal to the first optical polarization that enters at either of the second port and the third port is reflected to the other of the second port and the third port. The first optical path includes a first end optically coupled to the second port of the PBS to receive light from the second port and to direct light to the second port. The polarization reflector is coupled to a second end of the first optical path to reflect light received from the first optical path back to the first optical path with a reflected optical polarization that is orthogonal to a polarization of the light that initially enters the first optical path upon exiting the second port of the PBS. The second optical path includes a first end optically coupled to the third port of the PBS to receive light from the second port and to direct light to the third port. The reflector is coupled to a second end of the second optical path to reflect light received from the second optical path back to the second optical path with a reflected optical polarization that is the same as an optical polarization of the light at the third port when entering the second optical path.

In one example, the polarization reflector is a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

In another example, the polarization reflector includes a reflector and a quarter wave plate whose one of two orthogonal principal polarization axes is at 45 degrees with a polarization axis of light exiting the second port of the PBS. The quarter wave plate is located between the PBS and the reflector. The first optical path may include a polarization-maintaining (PM) fiber whose principal polarization direction is aligned with the polarization of the light exiting the second port of the PBS, where the quarter wave plate is coupled between a distal end of the PM fiber and the reflector to be at 45 degrees between one of two orthogonal principal polarization axes of the quarter wave plate and the principal polarization axis of the PM fiber.

In yet another example, the first optical path includes a first optical path segment containing the first end at one side and terminated at another side by a first optical port, and a second, separate optical path segment containing the second end at one side and terminated at another side by a second optical port. The first and second optical ports are structured to allow for an optical delay element to be connected between the first and second optical ports as part of the first optical path.

These and other examples and implementations are described in detail in the drawings, the detailed description and the claims.

DETAILED DESCRIPTION

The amount of the optical delay of an optical delay device can be increased by increasing the optical path length. For example, a fiber delay line can incase the length of the fiber in the fiber loop to increase the delay. However, such a method also increases the size and cost of the fiber loop or coil. In other applications, such as time domain optical coherence tomography (OCT), a large and fast optical delay change can be desirable. In some OCT applications, a change in the optical lay delay for a distance up to 10 mm with a changing rate up to 10 kHz may be desired. It can be difficult in practice to use a long fiber delay line capable of producing a large delay change to have a sufficiently high delay change rate for certain applications.

This specification describes, among others, techniques and device designs for quadrupling the signal delay in a given optical fiber loop or coil without increasing the actual length of the fiber. The polarization of light is manipulated to allow the light to pass through a fiber loop or coil four times in a relatively simple optical setup. Such optical delays can be applied to various applications to achieve a compact optical delay package, including OEO and OCT systems.

Figure 1:
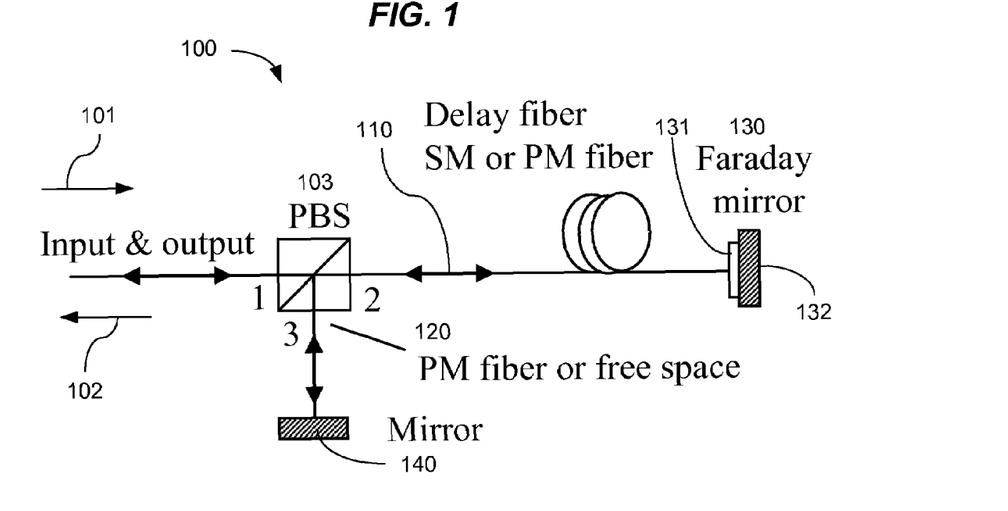
FIGS. 1 and 2 show two examples of an optical delay device that uses optical polarization property to produce an optical delay that quadruples a delay of an optical delay element by directing the light to transmit through the delay element four times.
Figure 2:
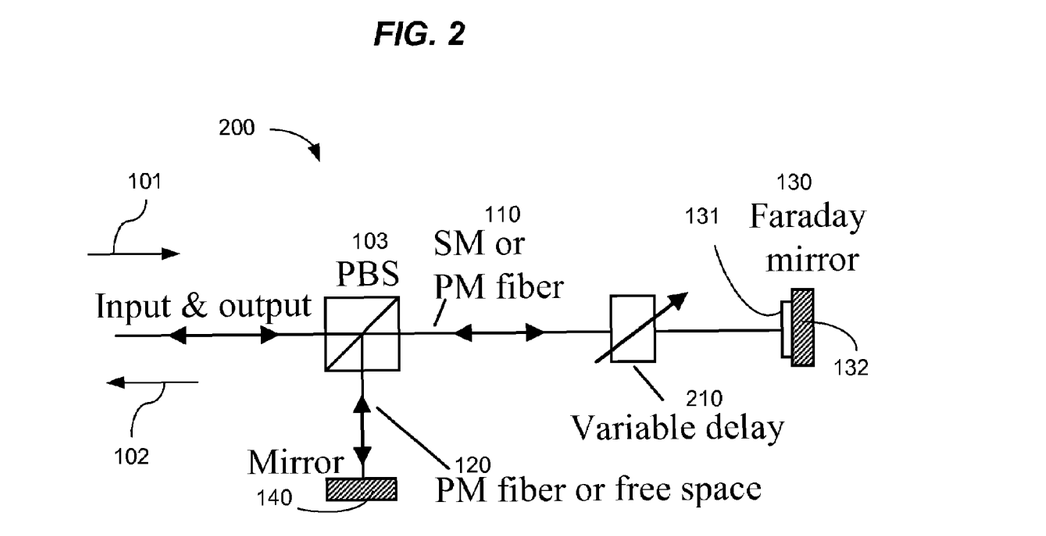

FIGS. 1 and 2 illustrate two examples 100 and 200 of optical delay devices that quadruple the signal delay in a given optical fiber loop or coil. In both optical delay devices 100 and 200, an optical polarization beam splitter (PBS) 103 is provided and is configured to include a first port 1, a second port 2 and a third port 3. An input light beam 101, which is linearly polarized at a first optical polarization, is directed into the port 1 of the PBS 103 and transmits through the PBS 103 between the first port 1 and the second port 2. The PBS 103 is configured to reflect light at a second optical polarization orthogonal to the first optical polarization, that enters the PBS 103 at either of the second port 2 and the third port 3, to the other of the second port 2 and the third port 3. Each of the optical delay devices 100 and 200 includes a first optical path 110 as the optical delay path having a first end optically coupled to the second port 2 of the PBS 103 to receive light from the second port 2 and to direct light back to the second port 2 and a Faraday reflector 130 coupled to a second end of the first optical path 110 to reflect light. The Faraday reflector 130 can be implemented by a Faraday rotator 131 and a reflector 132 and is configured to reflect light received from the first optical path 110 back to the first optical path 110 with a reflected optical polarization that is, at each location along the first optical path 110, orthogonal to an optical polarization of the light when traveling in the first optical path 110 from the PBS 103 towards the Faraday reflector 130 prior to the reflection.

Notably, each of the optical delay devices 100 and 200 includes a second optical path 120 having a first end optically coupled to the third port 3 of the PBS 103 to receive light from the second port 2 and to direct light to the third port 3; and a reflector 140 coupled to a second end of the second optical path 120 to reflect light received from the second optical path 120 back to the second optical path 120 with a reflected optical polarization that is the same as an optical polarization of the light at the third port 3 when initially entering the second optical path 120. Hence, the light reflected by the reflector 140 back to the port 2 of the PBS 103 remains in the second polarization and thus is reflected by the PBS 103 to the port 2 to travel in the first optical path 110 for the second time. After reflecting back by the Faraday rotator 130 for the second time, the light returns to the port 2 of the PBS 103 in the first polarization and thus transmits through the PBS 103 to emerge at the port 1 as the output light beam 102.

Under this design, the light 101 in the first polarization received at the port 1 of the PBS 103 travels through the first optical path 110 four times and the second optical path 120 two times and returns to the port 1 as the output light 102. A fiber delay loop or coil can be used as part of the first optical path 110 to quadruple the amount of the delay of the fiber loop.

The delay produced by the device 100 in FIG. 1 can be made variable by incorporating a variably element in either or both of the optical paths 110 and 120. Referring to FIG. 2, the optical delay device 200 implements a variable optical delay 210 in the first optical path 110 to produce a variable delay in the output 102. This variable delay can be achieved in various configurations, including a fiber stretcher engaged to a fiber loop. The variable optical delay 210 may be a variable delay element in a single mode (SM) fiber or a polarization maintaining (PM) fiber that is used to form the optical path between the port 2 of the PBS and the Faraday rotator. With this configuration, and a delay change is amplified four times. Alternatively, the variable delay can be implemented in the optical path formed by the port 3 of the PBS 103 and the mirror 140 where the a delay change is doubled.

In operation, the PBS 103 is used to receive an input light signal before directing the signal to the delay fiber in the first optical path 110. The polarization of the input light signal 101 is controlled so that the input light signal 101 is in the linear polarization that transmits through the PBS 103. The PBS 103 has three ports: port 1 to receive the input light signal 101, port 2 to receive the transmission of light received at the port 1 and port 3 to which a reflected signal produced by reflection of the light received at the port 2 is directed. In particular, the polarization of the light that enters the port 1 and transmits through the PBS at the port 2 is orthogonal to the polarization of light that enters the PBS at port 2 and is reflected to exit the PBS at the port 3. The delay fiber in the first optical path 110 is optically connected to the port 2 of the PBS to, at least, (1) receive optical transmission of light received at port 1, and (2) receive optical reflection of light received at port 3 and reflected by the PBS. The Faraday reflector 130 is placed at the end of the delay fiber to reflect light that transmits through the delay fiber for the second time back to the PBS 103. The Faraday rotator 131 is a 45-degree Faraday rotator to effectuate an ortho-conjugate property: the state of polarization (SOP) of the reflected light by the Faraday reflector 130 is orthogonal to the forward going beam at every point along the fiber in the first optical path 110. As a result, at the PBS 103, the SOP of the reflected signal is orthogonal to that of the forward going light and therefore all light signal is directed to port 3 of the PBS 103. The reflector 140 placed at the end of port 3 reflects the light from the port 3 back to the port 3 of the PBS 103 without changing its SOP. The reflector 140 can be a mirror that is directly attached to or formed on the facet of the port 3, or can be separated from the PBS 103 with a medium, such as a PM fiber or a free-space, as long as the SOP of the light is not changed when the light is directed back to the port 3 by the mirror 140. Because the reflected light from the mirror 140 retains its SOP, the PBS 103 reflects the reflected light from the mirror 140 to exit the PBS 103 at the port 2 to transmit through the delay fiber in the first optical path 110 for the third time and is reflected by the Faraday rotator 130 for the second time. This reflected light from the Faraday reflector 130 passes through the delay fiber for the fourth time to reach port 2 of the PBS 103. At the PBS 103, the SOP of the twice-reflected light by the Faraday mirror is orthogonal to the SOP for the light that is reflected by the PBS 103 from the port 3 to the port 2 and, therefore, is the same as that of the input light 101 received at the port 1. As a result, the twice-reflected light by the Faraday reflector 130, when entering the port 2, transmits through the PBS 103 to the input port 1 of the PBS 103. Therefore, the light passes the delay fiber totally 4 times before exiting the PBS 103 as the output light 102.

Figure 3:
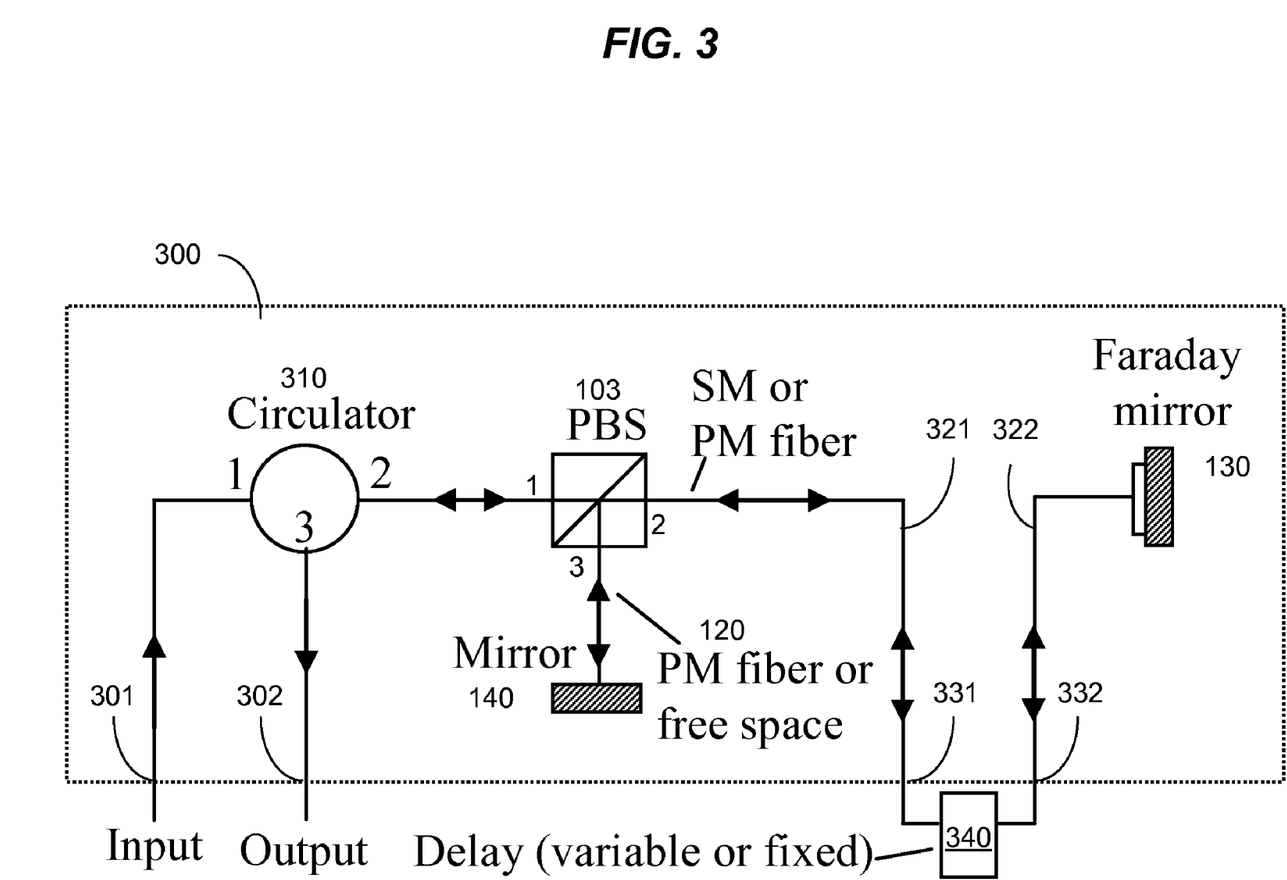
FIG. 3 shows an optical delay device that allows a user to connect a user optical delay element based on the designs in FIGS. 1 and 2.

FIG. 3 shows a stand-alone optical delay device 300 based on the designs in FIGS. 1 and 2 to allow a user to attach a user-selected optical delay element to quadruple the delay of the element. The optical delay device 300 includes an optical circulator 310, an input optical port 301 to receive input light to be delayed (e.g., the input beam 101), an output optical port 302 to output the delayed light (e.g., the output beam 102), and two user optical ports 331 and 332 for connecting the user optical delay element 340. The optical circulator 310 has three ports 1, 2 and 3 to direct light received at the port 1 to the port 2, and direct light received at the port 2 to the port 3. The port 1 is optically linked via a fiber or free space to the input port 301 to receive the input light. The port 2 is optically linked via a fiber or free space to the port 1 of the PBS 103 to direct light to the PBS 103 and to receive output light from the PBS 103. The port 3 of the circulator 310 is optically linked via a fiber or free space to the port 302 so that the light received from the port 1 of the PBS 103 is first directed by the circulator 310 and is sent out of the device 300 at the port 302. This circulator 310 can be implemented in the devices 100 and 200 in FIGS. 1 and 2 to route the input light 101 and the output light 102.

In device 300, the first optical path 110 in FIGS. 1 and 2 is replaced by an optical path 321 linking the port 2 of the PBS 103 and the first user optical port 331 and an optical path 322 linking the user optical port 332 and the Faraday reflector 130. The two optical paths 321 and 322 are not directly connected to each other and each of the two optical paths 321 and 322 can be a segment of fiber or free space. A user can connect the optical delay element 340, either fixed or variable, to the two user optical ports 331 and 332 to control the amount of the delay in the returned light at the output port 302. The ports 301, 302, 331 and 332 can be fiber ports to receive fiber connectors commonly used in fiber optics. A device casing can be used to enclose all components in FIG. 3 within an enclosure and the ports 301, 302, 331 and 332 are mounted on the device casing to allow for easy access by a user. All components can be enclosed in an enclosure that is represented by the box formed by dashed lines.

Figure 4:
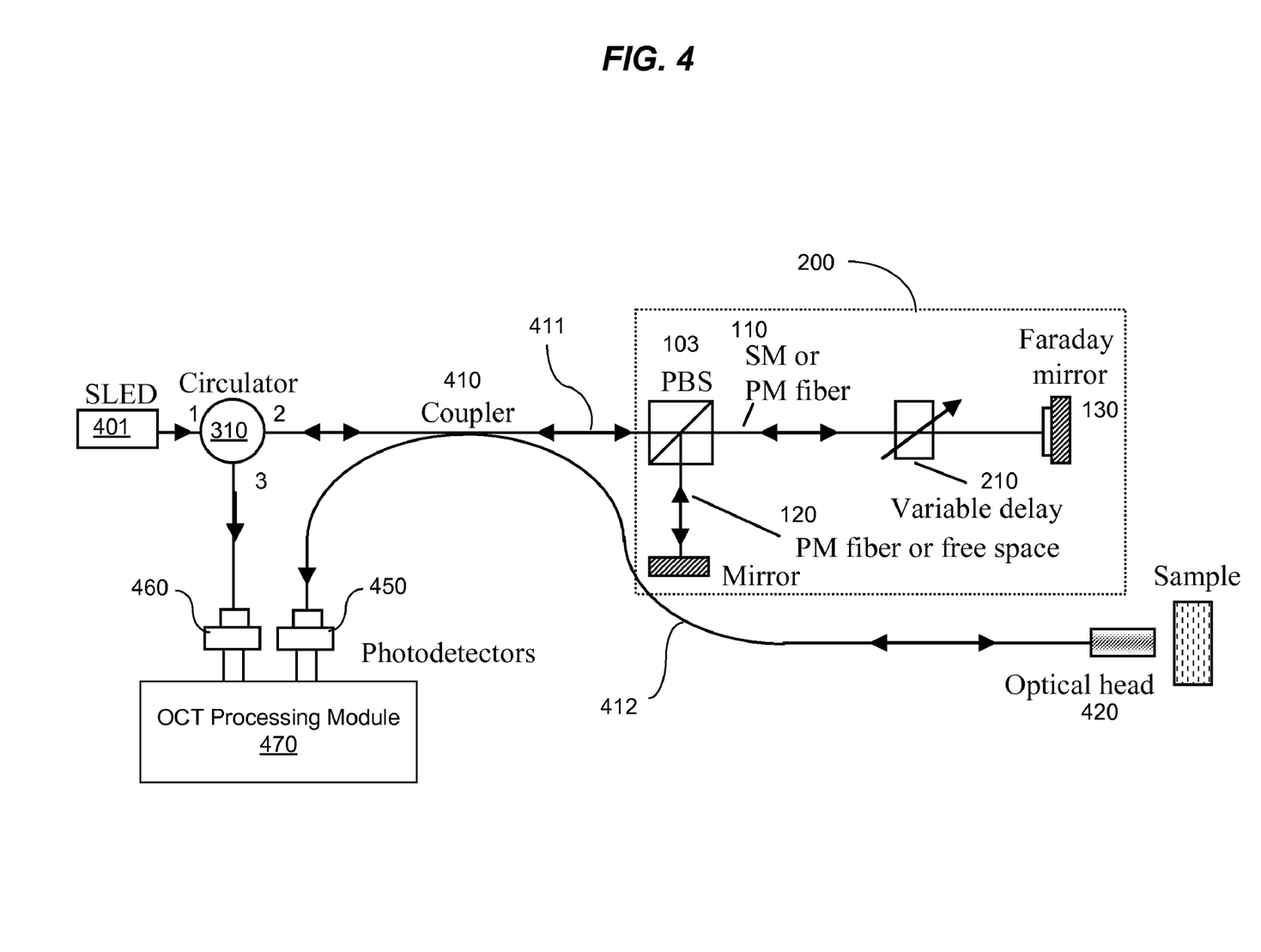
FIG. 4 shows an example of a fiber-based time-domain optical coherent tomography (OCT) device based on a variable optical delay device in FIG. 2.

FIG. 4 shows an example time-domain OCT system which uses a variable optical delay shown in FIG. 2. A broadband light source 401, such as a superluminescent LED (SLED), can be used to produce the input light for the OCT. An optical circulator 310 directs the input light from the SLED 401 to an optical coupler 410 which splits the input light into a reference beam along a reference optical path 411 and a signal beam along a separate probe optical path 412. The signal beam is directed to an optical head 420 at the distal end of the optical path 412 and the optical head 420 couples signal beam to a sample under measurement and collects reflected probe light from the sample. The collected probe light from the sample is directed by the optical head 420 to the coupler 410 along the probe optical path 412. The reference beam is directed to the variable optical delay device 200 in FIG. 2 connected in the reference optical path 411. The reflected reference beam from the variable optical delay device 200 is mixed with the reflected signal beam at the coupler 410 to interfere with each other. The coupler 410 produces a first output beam to a first optical detector 450 and a second output beam to the circulator 310 which directs the second output beam to a second optical detector 460. An OCT processing module 470 is connected to the detectors 450 and 460 to process the detector output signals and to produce OCT measurements of the sample.

Figure 5:
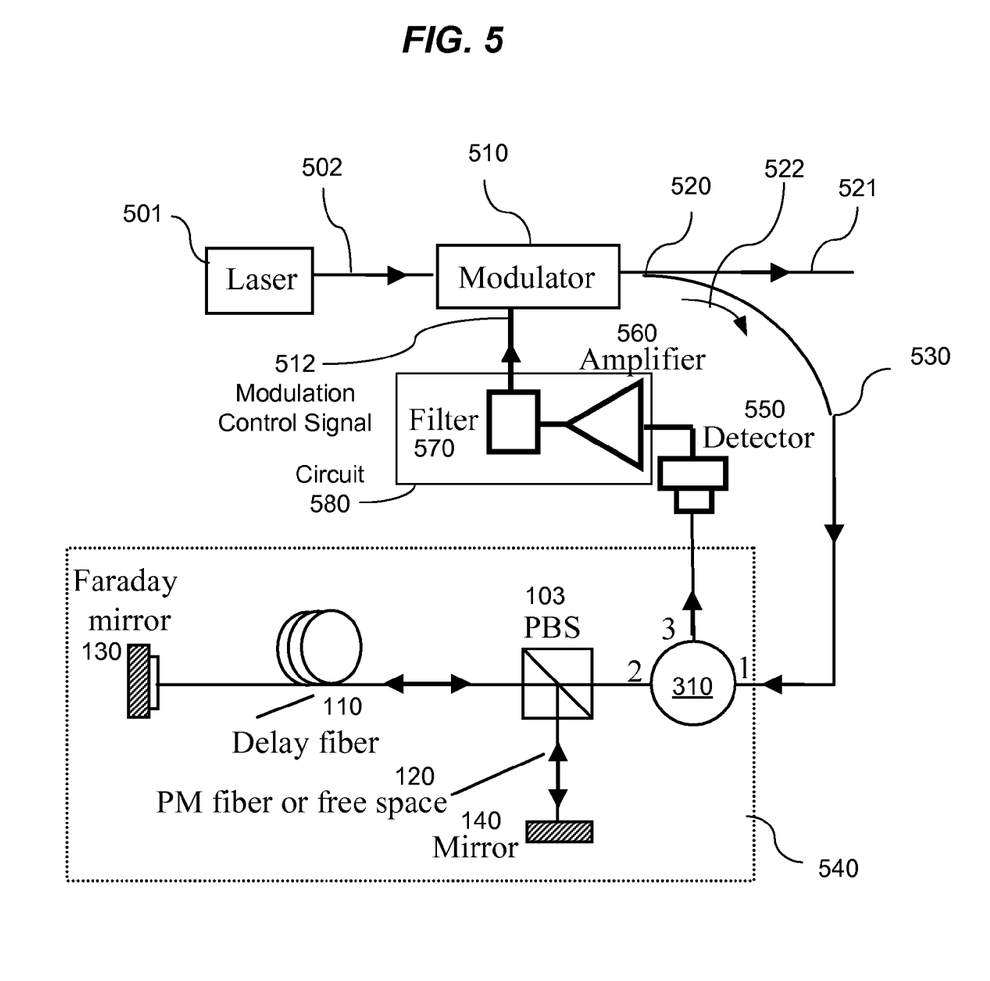
FIG. 5 shows an example of an opto-electronic oscillator that uses the optical delay device in either FIG. 1 or FIG. 2 in the optical part of the opto-electronic loop.

An opto-electronic oscillator (OEO) can be constructed using the optical delay device in either FIG. 1 or FIG. 2. FIG. 5 shows an opto-electronic oscillator (OEO) using the optical delay device in FIG. 1. The OEO includes a source laser 501 to produce a CW laser beam 502. An optical modulator 510 modulates the CW laser beam 502 in response to a modulation control signal 512 to produce modulated light. A part or the entirety of the modulated light output from the optical modulator 510 is coupled through an optical loop that includes the optical delay 100 in FIG. 1 through an optical circulator 310. The device 100 and the circulator 310 form a delay module 540 which is connected in the optical part of the opto-electronic loop. The output of the optical circulator 310, which is delayed, is then directed to an optical detector 550 which produces a detector output. The detector output is directed into an electronic circuit 580 which produces the modulation control signal 512 from the detector output. In this example, the electronic circuit 580 includes an amplifier 560 and an electronic bandpass filter 570 to select the desired oscillation frequency for the modulation control signal. The circuit 580 can be configured to allow for injecting an electrical signal into the loop or splitting part of the electrical signal as an electrical output. The signal paths from the optical modulator 510 to the optical detector 550 form the optical portion of the opto-electronic loop and the optical detector 550, the electronic circuit 580 and the optical modulator 510 form the electronic portion of the opto-electronic loop. The total loop gain for the opto-electronic loop is greater than the total loop loss and the feedback from the electronic circuit 580 to the optical modulator 510 is in phase so that the loop can sustain oscillation at the frequency selected by the electronic bandpass filter 570. An variable optical delay device can be used to vary the total loop delay by changing the delay in the optical delay 540, e.g., using the design in FIG. 2. This change in the optical delay can change the oscillation frequency within the bandwidth of the electronic bandpass filter 570.

The Faraday reflector in FIGS. 1 and 2 make the light in two opposite propagation directions in the first optical path 110 to be orthogonal in polarization at each location in the optical path 110. As such, a variety of optical transmission media can be used to construct the optical path 110, including free space, an optically isotropic material, PM fibers and non-PM fibers. The Faraday reflector is one of examples for a polarization reflector that is coupled to the second end of the first optical path 110. Such a polarization reflector reflects light received from the first optical path 110 back to the first optical path 110 with a reflected optical polarization that is orthogonal to a polarization of the light that initially enters the first optical path 110 upon exiting the second port 2 of the PBS 103.

Figure 6A:
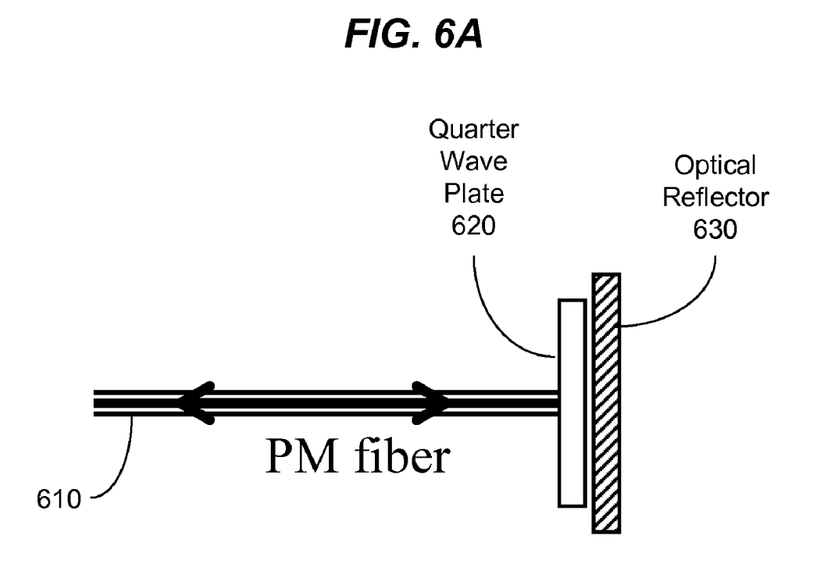
FIGS. 6A and 6B show a combination of a quarter wave plate and a reflector as an alternative device for substituting a Faraday reflector in FIGS. 1 and 2 in some implementations.
Figure 6B:
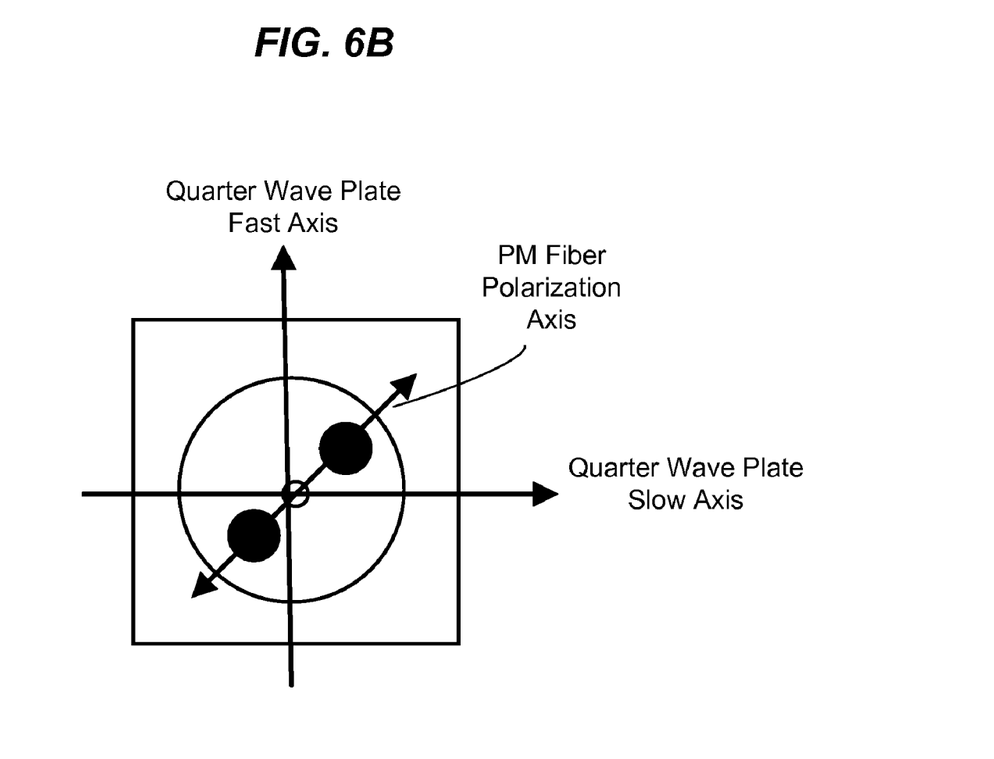

FIGS. 6A and 6B shows another example for this polarization reflector. This polarization reflector includes a combination of a quarter wave plate 620 and a reflector 630 is used to reflect light and a PM fiber 610 is used to guide light in the first optical path 110 by aligning a principal polarization direction of the PM fiber 610 with the polarization of the light exiting the port 2 of the PBS 103. In addition, the principal polarization axis of the PM fiber 610 is oriented to be 45 degrees with respect to one of the two principal polarization axes (either the slow axis or the fast axis) of the quarter wave plate 620. Under this design, the polarization of the polarized light directed from the PBS 103 to the reflector 630 in the PM fiber 610 is rotated 90 degrees after passing through the quarter wave plate 620 twice due to the reflection by the reflector 630. This design turns the quarter wave plate 620 into an effective half-wave plate. Therefore, if the output light from the PM fiber 610 is aligned with the slow axis of the PM fiber 610, the reflected light into the PM fiber 610 by the combination of the quarter wave plate 620 and the reflector 630 is then aligned with the fast axis of the PM fiber 610, or vise versa. This can make the reflected light to the PBS 103 to have an orthogonal polarization with the light transmitting through the PBS 103 and thus is reflected to the port 3 just like the designs with the Faraday reflector 130. The PM fiber 610 is used in this example to provide a polarization maintaining link between the port 2 of the PBS 103 and the quarter wave plate 620. An optical material that does not alter optical polarization of light can be used form the optical link between the port 2 of the PBS 103 and the quarter wave plate 620. For example, the space between the port 2 of the PBS 103 and the quarter wave plate 620 can be free space or filled with an optically isotropic material, where the quarter wave plate is aligned to place one of it's two orthogonal principal polarization axes at 45 degrees with a polarization axis of light exiting the second port of the PBS.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. An optical device, comprising:
an optical polarization beam splitter (PBS) having a first port, a second port and a third port, wherein light at a first optical polarization transmits through the PBS between the first port and the second port, and light at a second optical polarization orthogonal to the first optical polarization that enters at either of the second port and the third port is reflected to the other of the second port and the third port;
a first optical path having a first end optically coupled to the second port of the PBS to receive light from the second port and to direct light to the second port;
a polarization reflector coupled to a second end of the first optical path to reflect light received from the first optical path back to the first optical path with a reflected optical polarization that is orthogonal to a polarization of the light that initially enters the first optical path upon exiting the second port of the PBS;
a second optical path having a first end optically coupled to the third port of the PBS to receive light from the second port and to direct light to the third port; and
a reflector coupled to a second end of the second optical path to reflect light received from the second optical path back to the second optical path with a reflected optical polarization that is the same as an optical polarization of the light at the third port when entering the second optical path.

2. The device as in claim 1, wherein:
the polarization reflector is a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

3. The device as in claim 1, wherein:
the polarization reflector comprises a reflector and a quarter wave plate whose one of two orthogonal principal polarization axes is at 45 degrees with a polarization axis of light exiting the second port of the PBS, and
wherein the quarter wave plate is located between the PBS and the reflector.

4. The device as in claim 3, wherein:
the first optical path comprises a polarization-maintaining (PM) fiber whose principal polarization direction is aligned with the polarization of the light exiting the second port of the PBS, and
wherein the quarter wave plate is coupled between a distal end of the PM fiber and the reflector to be at 45 degrees between one of two orthogonal principal polarization axes of the quarter wave plate and the principal polarization axis of the PM fiber.

5. The device as in claim 3, wherein:
the first optical path between the PBS and the quarter wave plate is free space.

6. The device as in claim 1, comprising:
a variable delay element in the first optical path to change a path length of the first optical path.

7. The device as in claim 1, wherein:
the first optical path comprises a fiber loop and a fiber stretcher engaged to the fiber loop to change a path length of the fiber loop.

8. The device as in claim 1, comprising:
an optical circulator to direct input light to the first port of the PBS and to direct output light from the first port of the PBS as a beam separate from the input light.

9. The device as in claim 1, wherein:
the first optical path includes a first optical path segment containing the first end at one side and terminated at another side by a first optical port, and a second, separate optical path segment containing the second end at one side and terminated at another side by a second optical port, the first and second optical ports configured to allow for connection an optical delay device to be connected as part of the first optical path.

10. An optical device, comprising:
a light source to produce light;
an optical coupler to receive the light and to split the light into a signal beam and a reference beam;
a reference optical path to receive the reference beam and to reflect the reference beam back to the optical coupler; and
a signal optical path to receive the signal beam and having an optical head that couples the received signal beam to a sample and collects reflected light from the sample as a reflected signal beam to propagate in the signal optical path towards the optical coupler which mixes the reflected signal beam and the reflected reference beam to produce an optical interference signal,
wherein the reference optical path includes an optical delay device which comprises:
an optical polarization beam splitter (PBS) having a first port, a second port and a third port, wherein light at a first optical polarization transmits through the PBS between the first port and the second port, and light at a second optical polarization orthogonal to the first optical polarization that enters at either of the second port and the third port is reflected to the other of the second port and the third port, and wherein the first port receives the reference beam and the PBS transmits the received reference beam to the second port;

a first optical path having a first end optically coupled to the second port of the PBS to receive light from the second port and to direct light to the second port;

a polarization reflector coupled to a second end of the first optical path to reflect light received from the first optical path back to the first optical path with a reflected optical polarization that is orthogonal to a polarization of the light that initially enters the first optical path upon exiting the second port of the PBS;

a variable optical delay element coupled in the first optical path between the Faraday reflector and the PBS to produce a variable optical delay in light in the first optical path;

a second optical path having a first end optically coupled to the third port of the PBS to receive light from the second port and to direct light to the third port; and a reflector coupled to a second end of the second optical path to reflect light received from the second optical path back to the second optical path with a reflected optical polarization that is the same as an optical polarization of the light at the third port when entering the second optical path.

11. The device as in claim 10, wherein:
the polarization reflector is a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

12. The device as in claim 10, wherein:
the polarization reflector comprises a reflector and a quarter wave plate whose one of two orthogonal principal polarization axes is at 45 degrees with a polarization axis of light exiting the second port of the PBS, and
wherein the quarter wave plate is located between the PBS and the reflector.

13. The device as in claim 12, wherein:
the first optical path comprises a polarization-maintaining (PM) fiber whose principal polarization direction is aligned with the polarization of the light exiting the second port of the PBS, and
wherein the quarter wave plate is coupled between a distal end of the PM fiber and the reflector to be at 45 degrees between one of two orthogonal principal polarization axes of the quarter wave plate and the principal polarization axis of the PM fiber.

14. The device as in claim 10, wherein:
the signal optical path comprises a fiber that connects to optical head.

15. The device as in claim 10, comprising:
a first optical detector to receive a first portion of the optical interference signal from the optical coupler;
a second optical detector to receive a second portion of the optical interference signal from the optical coupler; and
a signal processing module to receive and process outputs from the first and second optical detectors to produce a measurement of the sample.

16. An optical device, comprising:
an opto-electronic oscillator having a closed opto-electronic loop that comprises an optical modulator which modulates CW laser light to produce a modulated optical output in response to an electrical modulation control signal, an electronic circuit to produce the electrical modulation control signal, an optical loop to receive the modulated optical output and an optical detector coupled between the optical loop and the electronic circuit to detect light from the optical loop and to produce a detector output which is directed into the electronic circuit to produce the electrical modulation control signal, wherein the optical loop comprises an optical delay module to receive at least a portion of the modulated optical output, the optical delay module comprising:

an optical polarization beam splitter (PBS) having a first port to receive light of the modulated optical output coupled into the optical loop, a second port and a third port, wherein light at a first optical polarization transmits through the PBS between the first port and the second port, and light at a second optical polarization orthogonal to the first optical polarization that enters at either of the second port and the third port is reflected to the other of the second port and the third port, and wherein the first port receives the reference beam and the PBS transmits the received reference beam to the second port;

a first optical path having a first end optically coupled to the second port of the PBS to receive light from the second port and to direct light to the second port;

a polarization reflector coupled to a second end of the first optical path to reflect light received from the first optical path back to the first optical path with a reflected optical polarization that is orthogonal to a polarization of the light that initially enters the first optical path upon exiting the second port of the PBS;

a second optical path having a first end optically coupled to the third port of the PBS to receive light from the second port and to direct light to the third port; and a reflector coupled to a second end of the second optical path to reflect light received from the second optical path back to the second optical path with a reflected optical polarization that is the same as an optical polarization of the light at the third port when entering the second optical path.

17. The device as in claim 16, wherein:
the polarization reflector is a Faraday reflector coupled to a second end of the first optical path to reflect light received from the first optical path back to the first optical path with a reflected optical polarization that is, at each location along the first optical path, orthogonal to an optical polarization of the light when traveling in the first optical path from the PBS towards the Faraday reflector prior to the reflection.

18. The device as in claim 16, wherein:
the polarization reflector comprises a reflector and a quarter wave plate whose one of two orthogonal principal polarization axes is at 45 degrees with a polarization axis of light exiting the second port of the PBS, and
wherein the quarter wave plate is located between the PBS and the reflector.

19. The device as in claim 18, wherein:
the first optical path comprises a polarization-maintaining (PM) fiber whose principal polarization direction is aligned with the polarization of the light exiting the second port of the PBS, and
wherein the quarter wave plate is coupled between a distal end of the PM fiber and the reflector to be at 45 degrees between one of two orthogonal principal polarization axes of the quarter wave plate and the principal polarization axis of the PM fiber.

20. The device as in claim 16, wherein:
the opto-electronic oscillator comprises a laser to produce the CW laser light to the optical modulator.

21. The device as in claim 16, wherein:
the electronic circuit comprises an electronic bandpass filter.

22. The device as in claim 16, wherein:
the optical delay module comprises a variable optical delay element in the first optical path to change a delay in light in the first optical path.

23. The device as in claim 16, wherein:
the optical delay module comprises a fiber loop and a fiber stretcher engaged to the fiber loop to change a length of the fiber loop, both the fiber loop and the fiber stretcher coupled in the first optical path to change a delay in light in the first optical path.

24. A method for providing an optical delay in light, comprising:
using an optical polarization beam splitter (PBS) having a first port, a second port and a third port to direct light at a first optical polarization to transmit through the PBS between the first port and the second port into a first optical path;
reflecting light received by the first optical path back to the second port of the PBS to have a reflected optical polarization that is, at each location along the first optical path, orthogonal to an optical polarization of the light when traveling in the first optical path away from the PBS prior to the reflection;
reflecting the reflected light received at the second port of the PBS to the third port of the PBS;
reflecting light at the third port of the PBS to the second port of the PBS as an output beam to travel in the first optical path with a reflected optical polarization that is the same as an optical polarization of the light when directed from the second port to the third port; and
reflecting the output beam received by the first optical path back to the second port of the PBS to have a reflected optical polarization that is, at each location along the first optical path, orthogonal to an optical polarization of the light when traveling in the first optical path away from the PBS prior to the reflection to transmit the output beam from the second port to the third port of the PBS.

25. The method as in claim 24, comprising:
adjusting a length of the first optical path to adjust an optical delay in the output beam.

\* \* \* \* \*